June 30, 1931.  F. GRAY  1,812,402
ELECTROOPTICAL TRANSMISSION SYSTEM
Filed Sept. 30, 1929
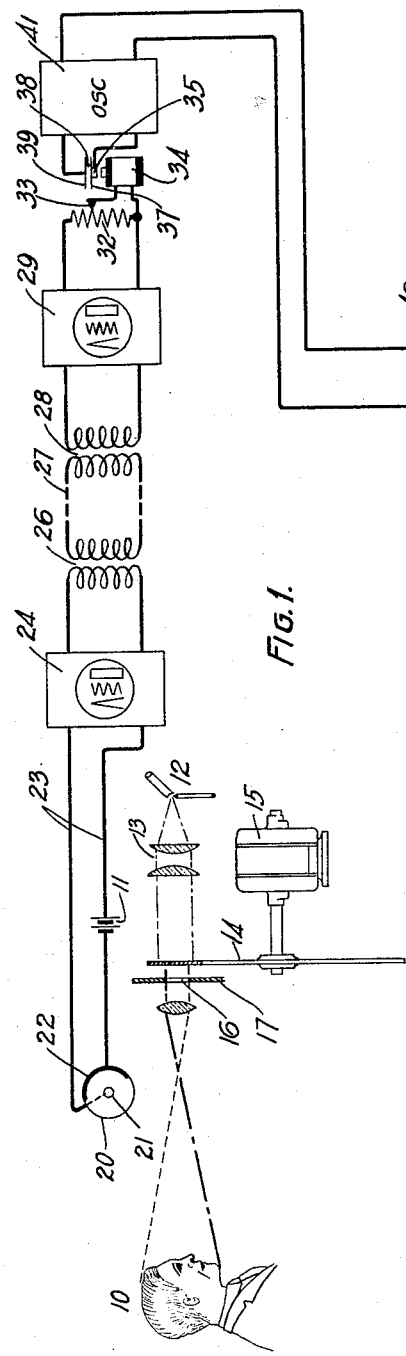
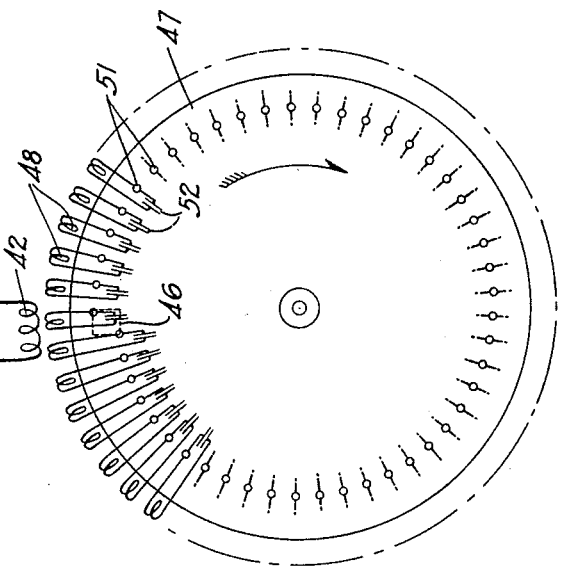
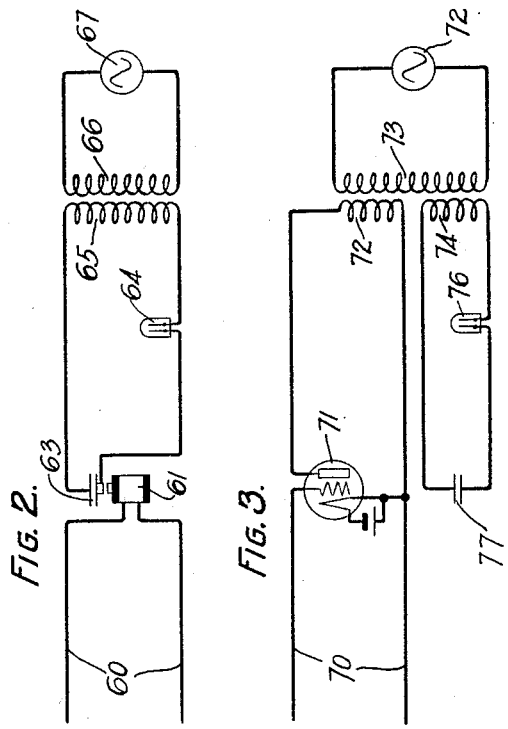
INVENTOR
F. GRAY
BY C. A. Sprague
ATTORNEY Patented June 30, 1931

1,812,402

UNITED STATES PATENT OFFICE

FRANK GRAY, OF NEW YORK, N. Y., ASSIGNOR TO BELL TELEPHONE LABORATORIES, INCORPORATED, OF NEW YORK, N. Y., A CORPORATION OF NEW YORK

ELECTROOPTICAL TRANSMISSION SYSTEM

Application filed September 30, 1929. Serial No. 396,093.

This invention relates to electro-optical methods and apparatus and particularly to apparatus for producing television images under control of received image current.

An object of the invention is to improve the efficiency of television and picture transmission systems or the quality and fineness of detail of the images, or both.

In accordance with a feature of the invention, means are provided for inductively energizing one or more moving lamps such as may be employed for producing an image under control of an image current.

In accordance with another feature of the invention there are provided a resonant circuit which is supplied with current from an alternating current source, and a source of signaling current, for example, an image current, for controlling the resonance characteristics of said circuit to vary the amplitude of the current flowing therein in accordance with the variations of the signaling current.

In a specific form of the invention hereinafter described in detail by way of example, an apparatus for producing television images comprises a spirally arranged row of primary sources of light such as electric lamps attached to a revolving disc near the periphery thereof and adapted to cross the field of view in succession to build up an image. Each lamp is connected to a circuit including a winding attached to the disc through which the lamp is inductively energized, while passing across the field of view, from a source of image current having variations corresponding to the tone values of successively scanned elemental areas of a field of view. The image current may be a current of varying amplitude which is supplied directly to the lamps through an inductive coupling. In a preferred embodiment, however, the circuit including each lamp is a tuned circuit having a fixed resonance characteristic which is supplied with energy from a current source, the frequency of which varies in accordance with the tone values of successively scanned elemental areas of the field of view. Instead of this arrangement the lamp circuit may be supplied inductively with current from a source of constant frequency and the resonance characteristics of the lamp circuit may be varied in accordance with the variations of the received image current. In any of these arrangements one or more lamps in fixed position may be employed in place of the moving lamp or lamps for producing an image of a field of view.

Illustrative embodiments of specific forms of the invention are shown in the accompanying drawings.

Fig. 1 of the drawings diagrammatically illustrates a television transmitting and receiving system;

Fig. 2 illustrates a system for producing signals, which system may be employed, for example, in place of a portion of the image producing system shown in Fig. 1; and Fig. 3 illustrates a modification of the system shown in Fig. 2.

Referring now to Fig. 1 of the drawings a field of view defined by an opening 16 in the screen 17 and including an object 10 is scanned by a rapidly moving pencil of light rays from a source 12 such as an electric arc. Concentrating lenses 13 direct the rays of light from the source 12 upon a limited area of a scanning disc 14. This disc is provided in the well-known manner with a series of spirally arranged apertures and is rotatably driven by a motor 15. Each slender pencil of rays passing through a single aperture in the scanning disc and through the opening 16 of the screen 17 scans a linear element of the field of view comprising the object 10 at such a rate that every portion or elemental area of the field of view is illuminated approximately 16 times per second. The light of varying intensity reflected from the object 10 is directed upon the light sensitive surface of a photoelectric cell 20 which is subjected to an electro-motive force of battery 11 and which comprises a central electrode or anode 21 and a light sensitive electrode or cathode 22. The variations in light are translated in a well-known manner into variations of electrical current in the circuit 23. This photoelectric current is amplified by the amplifying equipment 24. The alternating current from the amplifier 24 is impressed through transformer 26 upon a line 27 connecting the transmitting and receiving stations. This arrangement for scanning a field of view to produce an image current is disclosed in greater detail in applicant's copending application, Serial No. 227,649, filed October 21, 1927.

At the receiving station the image current received from the line 27 is impressed through a transformer 28 upon the amplifier 29 with which is associated a gain control or regulating circuit including a resistance element 32. A movable contact 33 is selectively associated with the resistance element 32 to impress a desired potential on the winding of an electromagnet 34 for mechanically vibrating a structure such as the armature 35. A piezo-electric crystal or other device may be employed in place of the electromagnet 34. The armature 35 is rigidly connected to a movable plate 37 of an electric condenser 38 which also has a fixed plate 39. This condenser forms a capacitative portion of an oscillatory circuit which controls the frequency of the current produced by a source of alternating current 41, such as a vacuum tube oscillator. The alternating current from this source preferably has a frequency higher than any frequency component present in the received image current so that the variations in the instantaneous values of amplitude of the alternating current will not interfere with the production of an image. The frequency of the current produced by the oscillator 41 and impressed upon the primary transformer winding 42 varies in accordance with the capacity variations of the condenser 38 and, therefore, in accordance with the amplitude of the incoming picture current.

The image field at the receiving station consists of the relatively small area 46 marked in dotted lines on the disc 47. This area may be defined by a screen or limited by the association between the secondary winding 48 and the primary winding 42. This field is illuminated so as to produce an image by means of a series of small lamps 51 arranged spirally upon the rotatable receiving disc 47 in a pattern similar to that of the spirally arranged apertures in the scanning disc 14 at the transmitting station. The lamps may each be viewed directly or through a small aperture in a screen associated with each lamp. These lamps may be arranged to construct an image larger or smaller in size than the opening 16 in the screen 17 at the transmitting station.

Each of the lamps 51 is connected in a resonant circuit comprising one of the inductive elements 48 and a capacitative element 52, the resonant frequency of each of these circuits preferably being such, with respect to the frequency of the current produced by the oscillator 41, that the current through the lamp is at a low value when the amplitude of the received image current is zero or of a low value. As the amplitude of the received image current actuating the device 34 increases, the frequency of the current produced by the oscillator 41 will decrease and approach the resonant frequency of the circuits including the lamps 51. As a result, the amplitude of the current actuating the lamp connected to the winding 48 which is adjacent to the winding 42 at this instant will be increased and the lamp will emit light of correspondingly higher intensity. The amplitude of the current flowing in the successively energized lamp circuits and therefore the intensity of the light emitted by the successive lamps will vary in accordance with the frequency variations of the current from the source 41 and, therefore, in accordance with the amplitude variations of the received image current or the tone values of the successive elemental areas of the field of view which is scanned at the transmitting station.

The disc 14 at the transmitting station and the disc 47 at the receiving station are maintained in synchronism and in phase by the use of any suitable synchronizing arrangement such as disclosed, for example, in the patent to H. M. Stoller and E. R. Morton, No. 1,763,909, June 17, 1930. If desired, these discs may be maintained in synchronism and in phase by means of independent sources of constant frequency energy at each station such as disclosed, for example, in a copending application of W. A. Marrison and J. W. Horton, Serial No. 256,784, filed February 24, 1928.

In the modified arrangement shown in Fig. 2 the received image current is impressed on a line 60 which is connected to an electromagnet 61. This electromagnet controls the capacity of a condenser 63 in a manner similar to that in which the capacity of condenser 38 of Fig. 1 is controlled. The condenser 63 forms a part of a resonant circuit which includes a lamp 64 and a transformer winding 65. This circuit is energized through the winding 66 by energy from the source 67 of alternating current having a constant frequency. As the capacity of the condenser 63 is changed in accordance with the amplitude variations of the image current impressed on the electromagnet 61 the natural resonance of the circuit including the lamp 64 and the amplitude of the current from source 67 flowing in the resonant circuit is changed correspondingly. The intensity of the light emitted by the lamp 64 therefore varies in accordance with the amplitude variations of the image current flowing in the line 60.

In the embodiment of the invention shown in Fig. 3 a source of image current is connected to the input circuit 70 of the electric discharge amplifier 71 the output circuit of which is connected to a transformer winding 72. A lamp 76 connected in a resonant circuit including a capacitative element 77 and an inductive winding 74 is energized through transformer winding 73 by current from the source of constant frequency alternating current 72. As the image current potential impressed on the input circuit 70 of the electric discharge amplifier 71 varies in amplitude the output or anode-cathode impedance of the electric discharge amplifier is changed correspondingly and thus the effective impedance of the winding 74 which is associated with the winding 72 is changed correspondingly. As the effective impedance of the winding 74 changes the frequency at which the circuit including the lamp 76 is resonant changes, thus causing a corresponding change in the amplitude of the current from source 72 flowing in this circuit.

It is obvious that when employing either of the arrangements shown in Figs. 2 or 3, a plurality of resonant circuits including the transformer winding, the condenser and the lamp could be provided and mounted on a rotatable disc as shown in Fig. 1. In such an arrangement the electromagnet 61 and the winding 66 of Fig. 2 or the winding 72 and 73 of Fig. 3 would be employed in place of the winding 42 shown in Fig. 1. In the former case condensers 63 of the moving circuits are located so that their paths are adjacent the stationary magnet 61 and the windings 65 of the moving circuits are so located that their path of travel is adjacent stationary coil 66. The stationary elements are of different length than the moving elements as indicated in Fig. 1. This is true also when the arrangement shown in Fig. 3 is substituted for the specific arrangement shown in Fig. 1.

In any of the arrangements heretofore described, a single fixed lamp and its associated circuit may be employed, instead of a plurality of movable lamps, together with an apertured scanning disc such as the disc 14 shown in Fig. 1. It is also obvious that a bank of lamps may be employed for reproducing the image, each lamp being connected to a source of energizing current from a rotating commutator. Image producing systems somewhat similar to both of these arrangements are disclosed in applicant's copending application to which reference has been made hereinbefore.

While an arrangement may be employed in which the lamp circuits shown in Fig. 1, for example, are non-resonant and in which the received image current of varying amplitude is impressed directly on the winding 42, the arrangement shown in Fig. 1 would be preferable in many cases because it has the advantage that the relatively small amplitude variations of the received image current are employed to produce relatively large variations in the current from a local source which energizes each lamp. An image of correspondingly increased brillancy is thus produced.

What is claimed is:

1. In combination, a source of continuously varying signaling current, a resonant circuit, light control means in said circuit, a source of alternating current for supplying current to said resonant circuit, and means responsive to said signaling current for controlling the resonance characteristics of said circuit to vary the amplitude of the current flowing therein in accordance with the variations of said signaling current.

2. An electro-optical image producing system comprising a source of image current, two inductively coupled circuits at least one of which is resonant, a lamp in one of said circuits, and means for changing the resonance characteristics of said one circuit in accordance with a characteristic of said image current.

3. In combination, a source of varying frequency current of substantially constant amplitude, a plurality of resonant circuits, and means for inductively impressing current from said source upon said resonant circuits in succession to cause the current flowing to have an amplitude which corresponds to the frequency of the current from said source.

4. In a signaling system, a transmitting station and a receiving station, a source of current at said transmitting station, means for varying the amplitude of said current in accordance with a signal to be transmitted, means for transmitting said varying amplitude signaling current to said receiving station, a source of current of high frequency with respect to the frequency components of said signaling current at said receiving station, a resonant circuit associated with said source of high frequency current, and means for varying the relation between the frequency of the current from said source and the frequency at which said circuit is resonant in accordance with the amplitude variations of said signaling current to cause the amplitude of the current in said resonant circuit to vary correspondingly.

5. In an electro-optical system, a plurality of stations, a source of varying amplitude signaling current at one of said stations, means for transmitting signaling current from said source to said other station, a source of high frequency alternating current at said other station, a resonant circuit including a source of light to be energized by current from said source, and means for varying the relation between the frequency of the current from said high frequency source, and the frequency at which said circuit is resonant in accordance with the amplitude variations of said received signaling current for correspondingly varying the 6. A television system comprising means including a source of television image current, a member mounted for rotation, a number of lamps and circuits therefor mounted on said rotary member, said lamps being arranged to be moved across a field of view by the rotation of said member, and current supply means to inductively energize each lamp by energy which varies in accordance with the variations of said image current while said lamp is in the field of view.

7. A television system comprising means at a transmitting station for producing an image current which varies im ampltiude in accordance with the tone values of successively scanned elemental areas of a field of view, an image of which is to be produced, means at a receiving station for presenting to view in rapid succession successive elemental areas of an image field in correspondence with the scanning of the field of view at said transmitting station, a source of high frequency alternating current and a resonant circuit at said receiving station, and means for varying the relation between the frequency of the current from said high frequency source and the frequency at which said circuit is resonant in accordance with the amplitude variations of said image current for controlling the illumination of successive elemental areas of said image field.

8. A television system comprising means at a transmitting station for scanning the elemental areas of a field of view in succession to produce an image current, a source of high frequency current at a receiving station, means for controlling the frequency of the current from said source in accordance with the amplitude variations of said image current, a rotatable disc driven in synchronism and in phase with said scanning means, a plurality of similar spirally arranged lamps mounted on said disc, a plurality of resonant circuits of similar characteristics, one associated with each of said lamps, and means for inductively energizing said lamps by current from said high frequency source for producing an image of said field of view.

9. An electro-optical system comprising an electric discharge device having an input and an output circuit, a source of energizing current connected to the input circuit of said device for controlling the output impedance thereof, a resonant circuit including a capacitative element, an inductive element and a lamp, a second inductive element connected in the output circuit of said electric discharge device for controlling the effective impedance of the inductive element in said resonant circuit in accordance with the variations of the output impedance of said electric discharge device, and a source of constant frequency current for supplying energy to said resonant circuit.

10. A television system comprising a source of high frequency image modulated current, a rotatable member, a plurality of circuits mounted on said rotatable member, a light controlling means in each of said circuits, stationary means adjacent said rotatable member but out of contact therewith energized by said modulated current for impressing modulated current upon said circuits in succession while crossing a field of view, and means for continuously rotating said rotatable member.

11. Television apparatus comprising a large number of energy translating elements to be successively energized during the production of an image and distributing means for television image current associated therewith comprising a rotatable member, a plurality of inductive elements carried by said member, and stationary inductive means adjacent the paths of travel of said moving inductive elements and cooperating therewith in turn to effect the transfer of said television current between said stationary and said moving inductive means.

12. Television apparatus comprising a large number of energy translating means to be successively energized during the production of an image made up of line series of elemental areas and distributing means for high frequency television image current associated therewith comprising a rotatable member, a plurality of inductive elements carried by said member and having the same path of travel, and stationary inductive means adjacent said path and cooperating with said moving inductive elements in turn to effect the transfer of said television currents therebetween, said stationary inductive elements extending in said direction of travel a distance at least equal to the total length of said path of travel divided by the number of line series of elements used to form the image.

13. In an electro-optical image producing system, apparatus at a receiving station comprising a circuit, light controlling means associated with said circuit and supplied with current therefrom, means for supplying alternating current to said circuit, means for varying, in accordance with the received image current, the amplitude of said alternating current supplied to said light controlling means comprising means for varying the ratio of the natural frequency of said circuit to the frequency of current therein.

14. An electroc-optical image producing system comprising a resonant circuit, a source of alternating current in said circuit, light controlling means in series with said source in said circuit, and means for varying the relative values of the frequency of current from said source and the frequency at which said circuit is resonant for correspondingly varying the amplitude of the current therein.

15. In an electro-optical image producing system, a plurality of circuits, light controlling means associated with said circuits respectively and supplied with current therefrom, means for supplying alternating current to said circuits in succession, and means for varying the amplitude of said alternating current in accordance with the tone values of an object an image of which is to be produced comprising means for varying the ratio of the natural frequency of said circuits to the frequency of current supplied thereto.

16. In an electro-optical image producing system, a plurality of circuits, light controlling means associated with said circuits respectively and supplied with current therefrom, means for supplying alternating current to said circuits in succession comprising a rotatable element upon which said circuits and light controlling means are mounted, and means for varying the amplitude of the alternating currents supplied to said light controlling means in accordance with the tone values of an object an image of which is to be produced comprising means for varying the ratio of the natural frequency of said circuits to the frequency of current supplied thereto.

In witness whereof, I hereunto subscribe my name this 28th day of September, 1929.

FRANK GRAY.